W. F. SCHACHT.
FORCE CUP.
APPLICATION FILED JAN. 22, 1914.
1,152,981.
Patented Sept. 7, 1915.
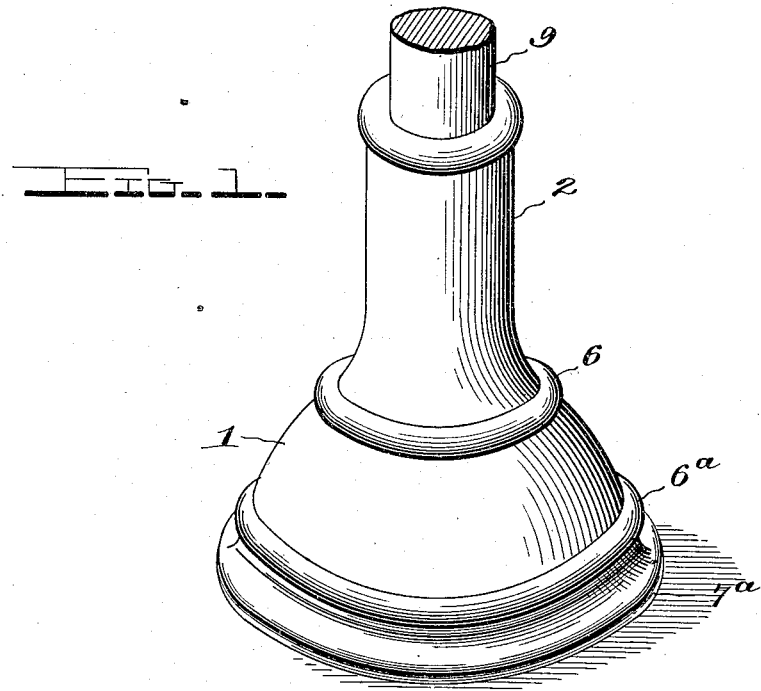
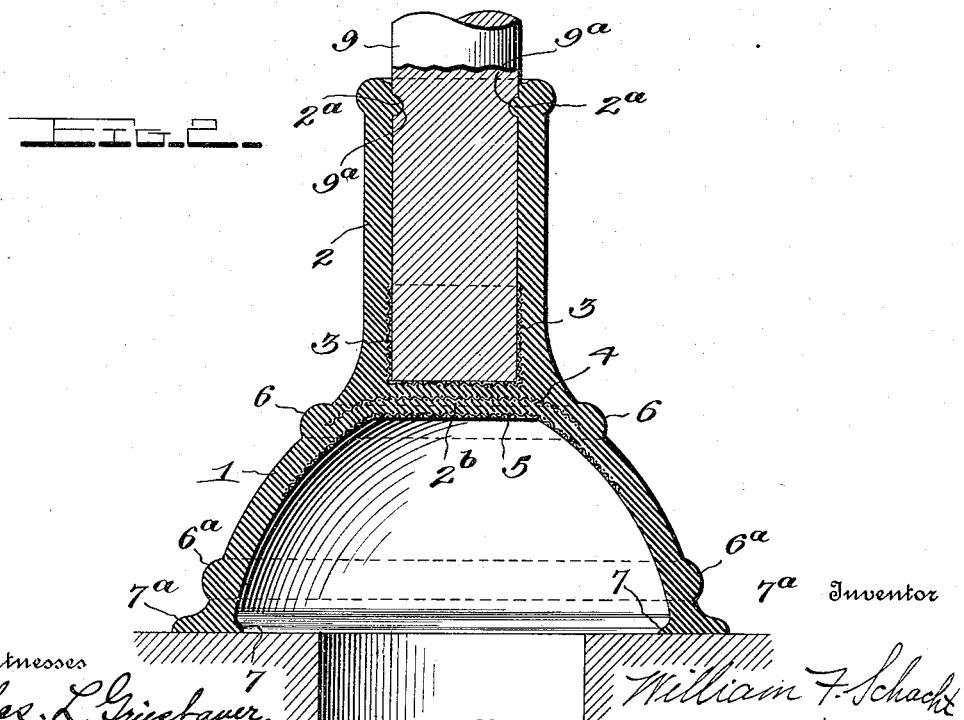

USE# UNITED STATES PATENT OFFICE.

WILLIAM F. SCHACHT, OF HUNTINGTON, INDIANA.

FORCE-CUP.

1,152,981.

Specification of Letters Patent.

Patented Sept. 7, 1915.

Application filed January 22, 1914. Serial No. 813,688.

*To all whom it may concern:*

Be it known that I, WILLIAM F. SCHACHT, a citizen of the United States, residing at Huntington, in the county of Huntington and State of Indiana, have invented certain new and useful Improvements in Force-Cups; and I hereby declare that the following is a full, clear, and exact description thereof, reference being had to the accompanying drawings, which form part of this specification.

This invention is a novel improvement in rubber force cups of the type shown in my Patent No. 930,236, of August 3, 1909; and the objects of the present invention are to prevent the handle punching in or breaking through the top of the cup when in use; and to prolong the life of the cup by providing same with reinforcing ribs which prevents its breaking when in operation.

I have concisely defined the invention in the claims and will now explain same in detail with reference to the accompanying drawings in which—

Figure 1 is a perspective view of the complete cup. Fig. 2 is a vertical section thereof.

My invention is applicable to rubber or elastic force cups, and in the form shown in the drawings resembles an ordinary cup having a conical cup or body portion 1 and an integral shank portion 2 above the cup portion and forming a handle therefor; the shank having an opening forming a socket for the engagement of the end of a handle 9, which is preferably provided with an annular groove $9^a$ adapted to be engaged by an annular collar $2^a$ at the upper end of and within the socket of shank 2. The lower end of the handle 9 rests upon the bottom wall $2^b$ of the socket, which wall is formed integral with the walls of the cup portion and the shank and closes the upper end of the cup portion in the usual manner.

A great deal of trouble has been experienced in the practical use of ordinary elastic force cups from the fact that the handles speedily break through the bottom walls of the sockets, which destroys the usefulness of the cup, as the breaks permit air to escape through the shank around the handle. This breaking through of the handle is due to the fact that in use the cup is placed over an opening and then is forcibly collapsed by pressure upon the handle, so as to force air from the cup into the opening and create a suction by the reaction of the cup when the pressure on the handle is released. In order to prevent the handle cutting through the bottom wall of the socket I reinforce the socket wall $2^b$ by means of layers of canvas or fabric, which are preferably placed in the bottom of the socket as shown at 3, such canvas layer being inseparably embedded in the rubber during the molding of the cup. This canvas strengthens the wall $2^b$ and reinforces it at the corners of the bottom of the socket, where it is ordinarily weakest, and greatly increases the durability of the cup as compared with the ordinary cups. I have practically demonstrated that such reinforced cup is more than 300% more efficient and durable than the ordinary cup. The wall $2^b$ might also be reinforced by molding a layer of canvas 4 within the top portion of the cup, as indicated in Fig. 2, such layer extending through the wall $2^b$. The cup might also be reinforced by a layer of canvas 5, incorporated in the inner wall of the cup, as indicated in Fig. 2. I do not consider it necessary to use all these reinforces except, perhaps, in very large cups. In small cups the reinforce 3 might be sufficient; in larger cups reinforces 3 and 5 might be used; in very heavy cups all the reinforces might be used.

When the handle is pushed down the ordinary cup is apt to collapse irregularly, that is it may give way at one side more quickly than the other, and in such cases the cup will quickly wear out at the weakest side. To prevent such injury to the cup, increase its efficiency, and cause it to bend practically uniformly circumferentially I provide the body 1 with integral spaced apart annular reinforcing ribs 6, $6^a$, preferably on its exterior, and of the same material as the cup. The upper of these circumferential ribs is preferably arranged adjacent to and slightly lower than the bottom of the socket, thus giving increased strength and rigidity to the socket and preventing it from breaking out when force is exerted upon the handle; the lower rib is preferably located near the bottom of the cup portion and prevents it bursting due to strain. These ribs also cause the cup to bend practically uniformly around its circumference and when it is collapsed increases and enhances the efficiency of the cup.

In order to make the cup take close hold of the surface to which it may be applied it may be provided with an annular internal foot flange 7 and an exterior foot flange or lip 7ᵃ, which latter is preferably thin. These flanges give increased breadth to the foot or bottom edge of the cup and will cause it when wet to make close air-tight contact between the surface on which it is placed so that the cup will operate most efficiently.

In a cup constructed in accordance with my invention, the handle will not puncture the cup, the cup will be more efficient in operation, its durability will be enhanced by reason of the reinforces, and the strengthening ribs, and the suction of the cup is enhanced by the foot flanges.

What I claim is:

1. A force cup comprising an elastic cup-body formed with an integral shank having a handle socket therein, and a fabric reinforce embedded in the material of the cup at the base of the socket, substantially as and for the purpose described.

2. A force cup comprising an elastic cup-body having an integral shank provided with a handle socket and a canvas reinforce for the bottom of the socket embedded in the material of the cup, substantially as described.

In testimony that I claim the foregoing as my own, I affix my signature in presence of two witnesses.

WILLIAM F. SCHACHT.

Witnesses:
H. E. ROSEBROUGH,
J. G. PRICE.

Copies of this patent may be obtained for five cents each, by addressing the "Commissioner of Patents, Washington, D. C."